United States Patent
Blackburn et al.

(10) Patent No.: US 7,023,877 B1
(45) Date of Patent: Apr. 4, 2006

(54) SMALL FORM FACTOR DIGITAL VOICE MULTIPLEXER WITH MULTIPLE DSL OUTPUTS

(75) Inventors: Thomas L. Blackburn, San Jose, CA (US); James Hon, Pleasanton, CA (US)

(73) Assignee: GoDigital Networks Corporation, Fremont, CA (US)

(*) Notice: Subject to any disclaimer, the term of this patent is extended or adjusted under 35 U.S.C. 154(b) by 930 days.

(21) Appl. No.: 09/991,380

(22) Filed: Nov. 15, 2001

Related U.S. Application Data

(60) Provisional application No. 60/334,736, filed on Oct. 31, 2001.

(51) Int. Cl.
 *H04J 3/16* (2006.01)

(52) U.S. Cl. ........................ 370/465; 370/535
(58) Field of Classification Search .............. None
 See application file for complete search history.

(56) References Cited

U.S. PATENT DOCUMENTS

| | | | | |
|---|---|---|---|---|
| 5,771,236 | A  * | 6/1998  | Sansom et al. | 370/535 |
| 6,002,502 | A  * | 12/1999 | Pomp et al. | 398/45 |
| 6,052,412 | A    | 4/2000  | Ruether et al. | 375/231 |
| 6,055,268 | A  * | 4/2000  | Timm et al. | 375/229 |
| 6,151,364 | A    | 11/2000 | Ruether et al. | 375/254 |
| 6,477,595 | B1 * | 11/2002 | Cohen et al. | 379/93.14 |
| 6,813,325 | B1 * | 11/2004 | Lin | 375/354 |
| 6,829,246 | B1 * | 12/2004 | Silberman et al. | 370/463 |

* cited by examiner

*Primary Examiner*—Duc Ho
*Assistant Examiner*—Phuongchau Ba Nguyen
(74) *Attorney, Agent, or Firm*—Sierra Patent Group, Ltd.

(57) ABSTRACT

An apparatus for multiplexing a digital data input into DSL outputs is disclosed. In one disclosed aspect, the apparatus may be embodied in an enclosure having a height of one rack-unit. The apparatus may include a transceiver for providing connectivity to a digital data line providing 24 DS0 channels. The apparatus may also include at least one DSL transceiver for multiplexing DS0 channels onto corresponding DSL-compatible transmission media using DSL technology. The apparatus may be mounted within a remote terminal (RT), and may receive the digital data line from within the RT.

32 Claims, 7 Drawing Sheets

SMALL FORM FACTOR DIGITAL VOICE MULTIPLEXER WITH MULTIPLE DSL OUTPUTS

CROSS-REFERENCE TO RELATED APPLICATIONS

This application claims priority to an earlier U.S. Provisional Application Ser. No. 60/334,736, filed Oct. 31, 2001.

BACKGROUND

1. Field of the Invention

The disclosure relates generally to voice communications, and in particular to an apparatus providing small form factor DS1/T1 multiplexer with multiple DSL outputs.

2. The Prior Art

Background

FIG. 1 is a diagram of a prior art Plain Old Telephone Service (POTS) System 100. The system 100 may include a Central Office Switch (CO Switch) 104, located inside a Central Office 102, also referred to as a wire center, for interfacing with the Public Switched Telephone Network 106 (PSTN). The CO Switch 104 may include a functionality which terminates subscriber lines.

POTS service is typically delivered in at least two manners. Today, typically about 75% of customers are delivered POTS service through a twisted copper pair that terminates directly at the CO switch inside the CO, as shown by subscribers $108_1 \ldots {}_n$ being coupled to the CO switch 104 through copper twisted pairs 110.

The other 25% of the customers may be delivered POTS service through a twisted copper pair loop that terminates in a Remote Terminal (RT) 116. Depending upon the individual configuration, a RT is typically installed near a target neighborhood, and is approximately 4×4×4 feet, and is installed on a concrete pad. The RT is used to transport POTS signals in digital form out to the CO through an optical link 118. The POTS lines from subscribers $112_1 \ldots {}_n$ terminate through twisted copper pairs 114 at the RT 116. Other configurations of RTs exist, for example, an underground RT is known as a Controlled Environmental Vault (CEV), and larger, above-ground units are known as "Huts". For convenience, all such configurations will be referred to herein as RTs.

RTs provide an important delivery point for POTS service. As the PSTN and Internet are continually expanded or upgraded, more services will be deployed through digital links such as optical networks. Thus, the percentage of POTS lines delivered through RTs will continue to grow.

SUMMARY

A apparatus, referred to as a carrier node herein, for multiplexing a T1 input into multiple DSL outputs is disclosed. In one disclosed aspect, the carrier node may be embodied in an enclosure having a height of one rack-unit (RU, or approximately 1.75 inches). The carrier node may include a T1/DS1 transceiver for providing connectivity to a T1/DS1 line, thereby providing 24 DS0 channels. The carrier node may also include at plurality of DSL transceivers for multiplexing DS0 channels each onto a corresponding DSL-compatible transmission medium using DSL technology.

The carrier node may be mounted within a remote terminal (RT), and may receive a digital data line from within the RT.

BRIEF DESCRIPTION OF THE DRAWING FIGURES

DETAILED DESCRIPTION

Figure 1:
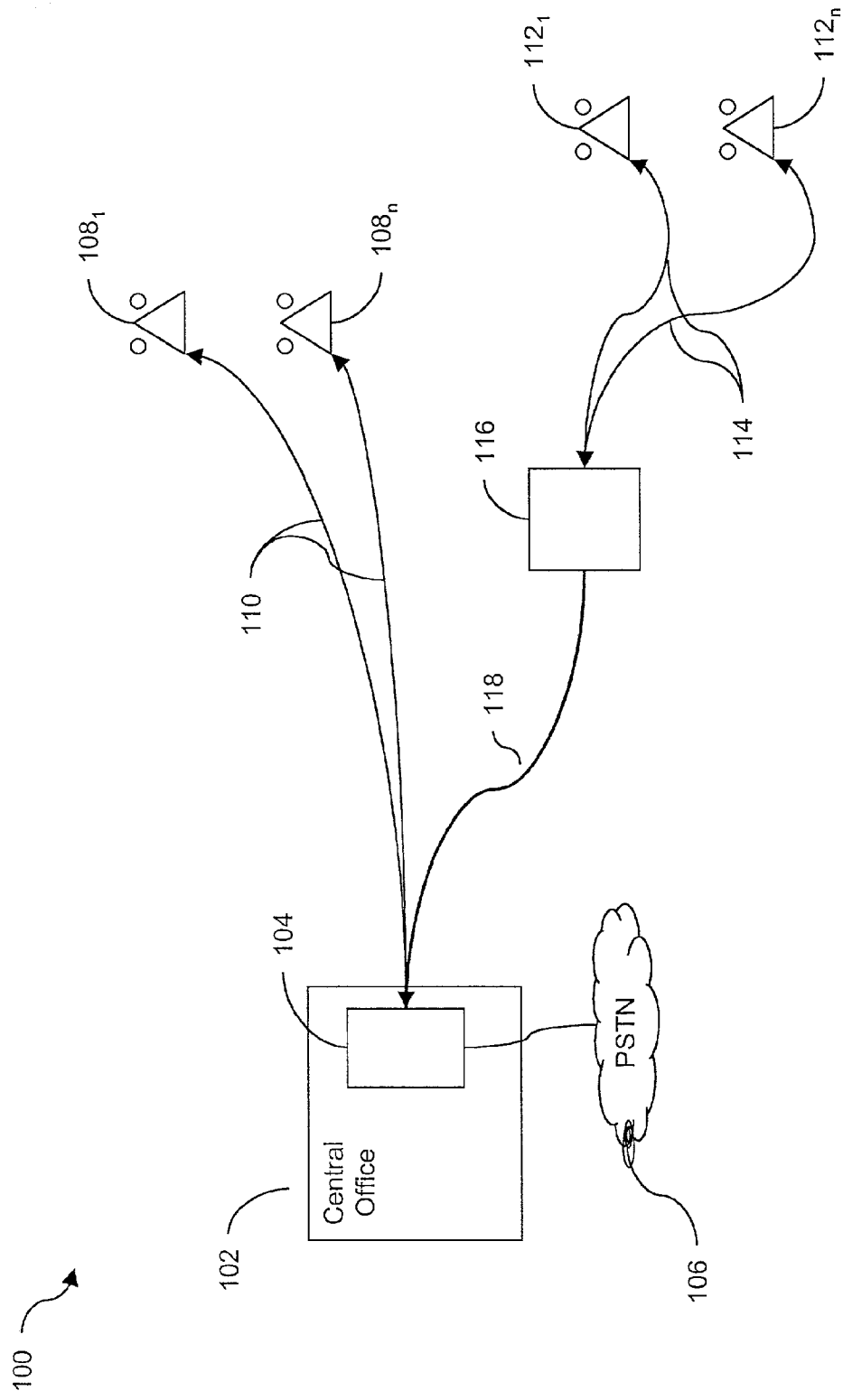
FIG. 1 is a block diagram of a prior art POTS system.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to voice communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

Exemplary embodiments of disclosed apparatus and methods may be disclosed herein. The word "exemplary" is used exclusively herein to mean "serving as an example, instance, or illustration." Any embodiment described as an "exemplary embodiment" is not to be construed as necessarily preferred or advantageous over other embodiments described herein.

Figure 2A:
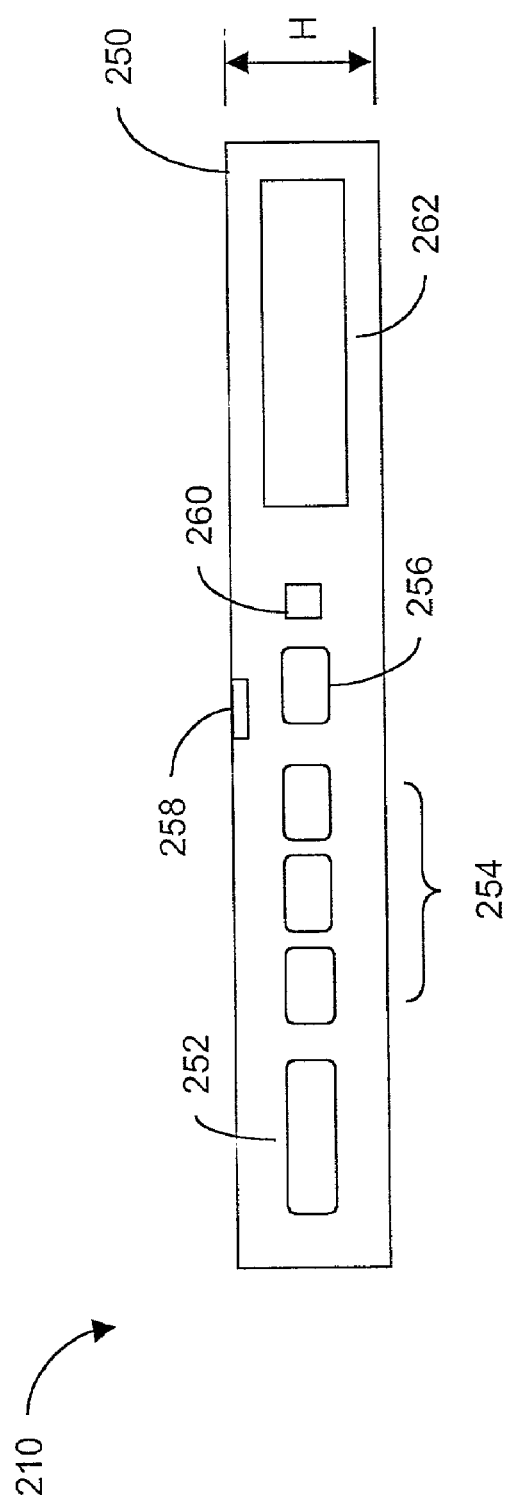
FIG. 2A is a rear-view functional block diagram of a carrier node configured in accordance with this disclosure, showing interfaces and connectivity.

FIG. 2A is a functional diagram of a carrier node 210 configured in accordance with the teachings of this disclosure. FIG. 2A illustrates a rear view of an exemplary embodiment of a carrier node 210. The carrier node 210 preferably receives service from a DS-1 (the digital equivalent of twenty-four POTS lines), and provides service to separate outside plant (OSP) spans using DSL technology.

The elements in each span may be coupled to the carrier node 210 using a single conventional twisted copper pair between each element.

The carrier node 210 may be housed in an enclosure 250 having a height H of one rack unit (one RU, approximately 1.75 inches in height), and may reside in a 19 or a 23-inch rack in a central office (CO), or a remote terminal's (RT) rack.

The carrier node 210 may have several connections for providing connectivity. For example, the carrier node 210 may have several rear-mounted connections, such as a DSX-1 carrier connection 252, and at least three DSL connections 254 for providing connectivity to at least three OSP spans. The carrier node 210 of this disclosure preferably feeds three OSP spans, and FIG. 2A shows that the carrier node 210 may include three DSL connections 254, though more or less OSP spans may be fed depending on the particular application or space available.

The carrier node 210 may include additional functionality and connectivity. For example, the carrier node 210 may include an alarm contact closure sensor 258, and a bypass pair connection 256. The carrier node 210 may also include a modem communication interface 260.

The carrier node 210 may also include a user interface 262. It is contemplated that the user interface area 262 may include a wide variety of features to aid in the operation and diagnostics of the carrier node. For example, the user interface area may include status-indicating LEDs, a user input interface consisting of switches and an alphanumeric LED display, and an RS-232 serial craft interface. Though the user interface is shown located on the rear of the carrier node 210, the user interface may be located where it is most convenient, such as on the front of the carrier node.

The carrier node may be configured to provide CO connectivity to aid in the isolation of faults as both the modem interface 260 and the craft interface 262 can be used to retrieve diagnostic information.

The carrier node 210 may be TR-008 compatible and GR-303 interoperable. The locally powered internal electronics (described below) may be NEBS and UL compliant, and preferably operate over a temperature range from −40° C. to +65° C. The internal electronics preferably reside on a PC board that can be installed and removed from its housing while powered-up without disturbing any of the enclosure's rear-mounted connections. The carrier node 210 preferably may be mounted either horizontally or vertically without the need for external cooling fans so long as sufficient rack space clearance is provided.

It will be appreciated from FIG. 2A that the carrier node 210 integrates a T1/DS1 receiver and multiple DSL outputs in a single enclosure. As will be described below, the carrier node 210 may be configured to advantageously perform line-powered, pair gain functions using a digital DS1 upstream interface.

Figure 2B:
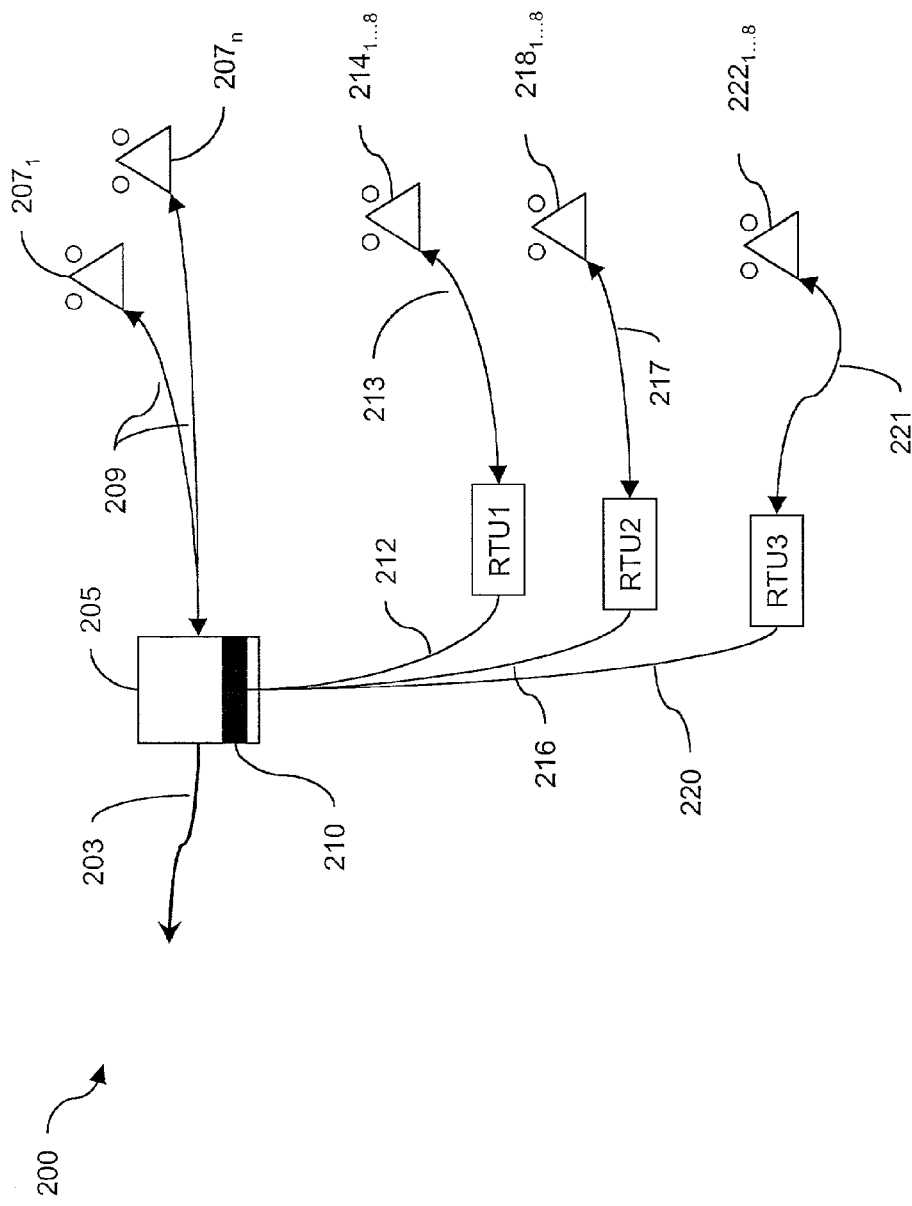
FIG. 2B is a block diagram of a voice system including a carrier node configured in accordance with this disclosure.

FIG. 2B is a block diagram of a POTS line distribution system 200 configured in accordance with this disclosure. FIG. 2B illustrates the deployment of a carrier node 210 within a RT 205 in an exemplary system 200. The carrier node 210 is preferably mounted within a RT and receives a DS1 interface from the RT. The DS1 interface may be provided as a short-hop serial bus interface within the RT.

From within the RT, the carrier node 210 may receive a digital communication signal (24 64 kbps channels, plus overhead) and provide pair gain functionality by distributing service through three line-powered pairs using DSL technology. As will be appreciated by those skilled in the art, to the downstream OSP elements, the carrier node 210 appears to be a CO shelf element. As mentioned above, more or less than three OSP spans may be provided depending on the particular application. For example, 2–12 line spans may also be provided.

The various elements of the system 200 of FIG. 2B will now be disclosed in more detail.

The system 200 may include a Remote Terminal (RT) 205. As mentioned above, an RT is configured to transport POTS signals in digital form out to a CO (not shown) through an optical link 203, and may be embodied as an above-ground RT, an underground Controlled Environmental Vault (CEV), or a larger, above-ground unit such as a Hut. The RT may also provide POTS service directly to subscribers $207_{1 \ldots n}$ through copper pairs 209.

The system 200 may include a carrier node 210 operatively coupled to the RT 205. In a preferred embodiment, the carrier node 210 is configured to receive a digital data line containing 24 DS0 lines (POTS channels), and distribute the POTS channels as three, eight-line systems to three Remote Terminal Units (RTU), shown as RTU1–3, using DSL technology. The carrier node 210 will be described in further detail below.

RTU1, RTU2, and RTU3 are each configured to demodulate the upstream DSL signal and distribute POTS channels to subscribers $214_{1 \ldots 8}$, $218_{1 \ldots 8}$, and $222_{1 \ldots 8}$, respectively. RTU1 may be coupled to the carrier node 210 through a copper pair 212, and to POTS subscribers $214_{1 \ldots 8}$ though 8 copper pairs 213. Likewise, RTU2 may be coupled to the carrier node 210 through a copper pair 216, and to POTS subscribers $218_{1 \ldots 8}$ though 8 copper pairs 217; and RTU3 may be coupled to the carrier node 210 through a copper pair 220, and to POTS subscribers $222_{1 \ldots 8}$ though 8 copper pairs 221. A more detailed description of a RTU will be given below.

Figure 3:
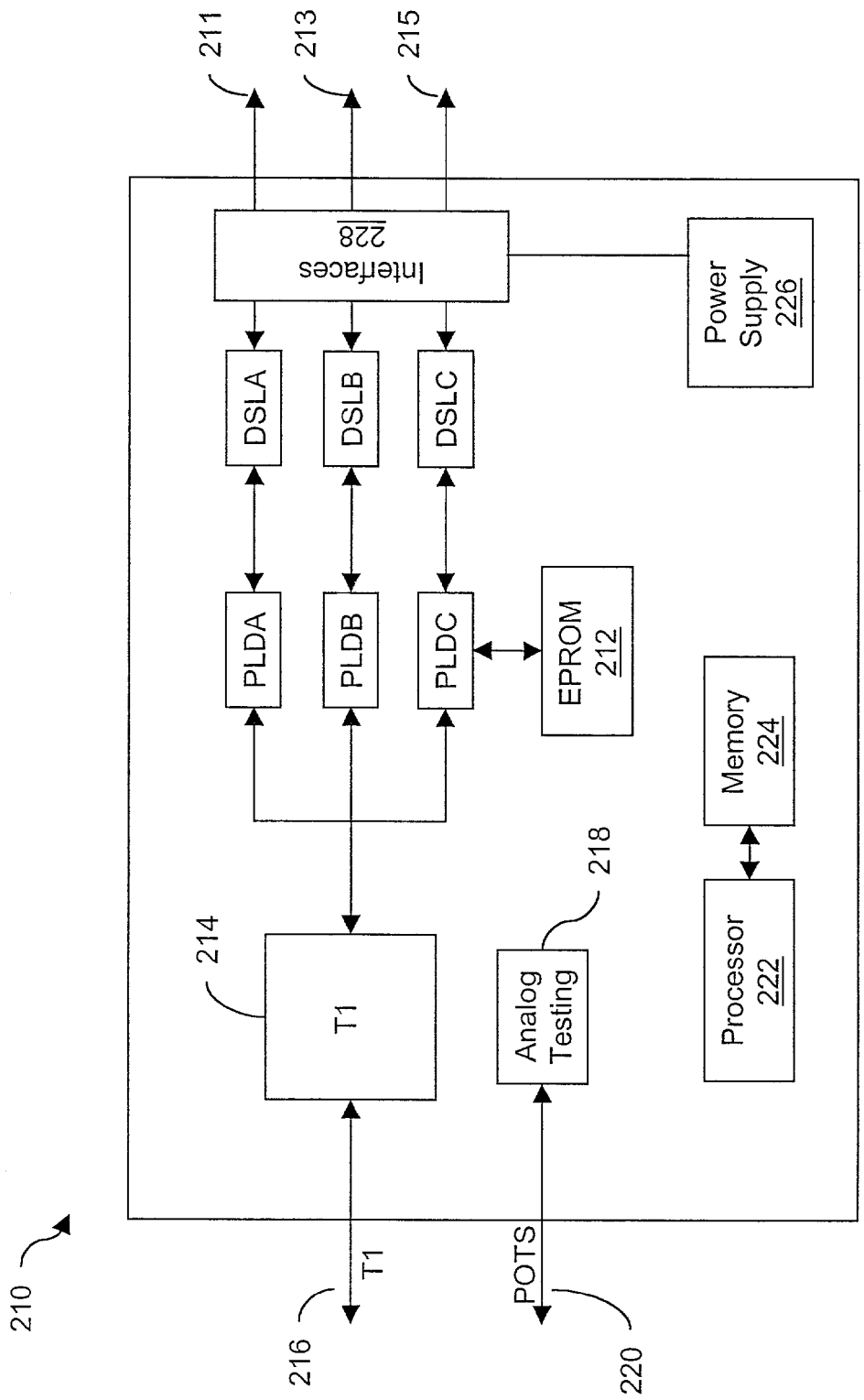
FIG. 3 is a block diagram of a carrier node configured in accordance with this disclosure.

FIG. 3 is a block diagram of a carrier node 210 configured in accordance with the teachings of this disclosure. The carrier node 210 is preferably configured to receive a DS1 line and power three eight-line POTS systems.

The carrier node 210 may also include at least three DSL transceiver modules DSLA, DSLB, and DSLC for generating the DSL transport. The transceivers are preferably configured to drive the lines downstream from the carrier node 210 through DSL-compliant copper pairs 211, 213, and 215, respectively.

Though three DSL transceivers are shown, it is to be understood that more transceivers may be provided depending on the particular application or available space. It is contemplated that the carrier node 210 may contain N number of DSL transceivers for multiplexing 24/N DS0 channels onto a corresponding number of DSL-compatible transmission media using DSL technology.

The carrier node 210 may also include three programmable logic devices (PLD) PLDA, PLDB, and PLDC for driving the DSL transceivers DSLA, DSLB, and DSLC, respectively. The PLD 210 may comprise a field programmable gate array as is known in the art, and may be programmed to provide additional hardware functionality as may be required. The PLDs may be configured to provide DSL framing for their respective 64 kbps TDM channels using methods known in the art.

The carrier node 210 may also include a transceiver 214 for interfacing the carrier node 210 with a data line 216. The transceiver 214 may be configured to receive a data line containing 24 DS0 channels, such as a T1 or DS1 line. The transceiver 214 may comprise a DS1 transceiver as is known in the art, such those available from Dallas Inc. The transceiver 214 may be configured to interface between the data line 216 and the three programmable devices PLDA-C.

The carrier node 210 may also include a EPROM memory 212 for storing programming information used by the programmable devices PLDA-C.

The carrier node 210 may also include an analog communication module 218 for interfacing through a POTS line 220. The communication module 218 may be configured to provide diagnostic information through a modem using techniques known in the art.

The carrier node 210 may also include a processor 222 for providing control. The carrier node 210 may also include associated memory and support circuitry 224 for the storage and retrieval of data and instructions. The processor 222 or the memory 224 may also include non-volatile memory elements to non-volatile programming capability. It is contemplated that a wide variety of processors may be used in the carrier node 210, such as a Motorola® Cold Fire processor. The processor 222 may be coupled to the various elements of the carrier node 210 through a bus as is known in the art.

The carrier node 210 may include a power supply 226 configured to receive and transform the standard −48 VDC signal from the host RT into the line power needed by the various elements. The power supply 226 may be user selectable, allowing an end user to select a Telcordia GR-1089-compliant power level, such as +/−190V, 130V, or 100V.

The carrier node 210 may also include line transport interfaces 228 for 5 interfacing data from the DSL transceivers to the telephone cable pairs 211–215. The interfaces 228 may include passive components as is known in the art, such as inductors and transformers, for impedance matching. Additionally, the interfaces 228 may be configured to couple DC line power voltage from the power supply 226 onto the cable pairs 211–215 to provide remote power to units coupled downstream along the cable pairs, while isolating any AC component from sensitive circuitry on the carrier node 210. Such isolation and coupling may be implemented by using multiple-tap transformers.

As shown in FIG. 2B, the output of the carrier node 210 feeds three remote terminals RTU1, RTU2, and RTU3.

Figure 4:
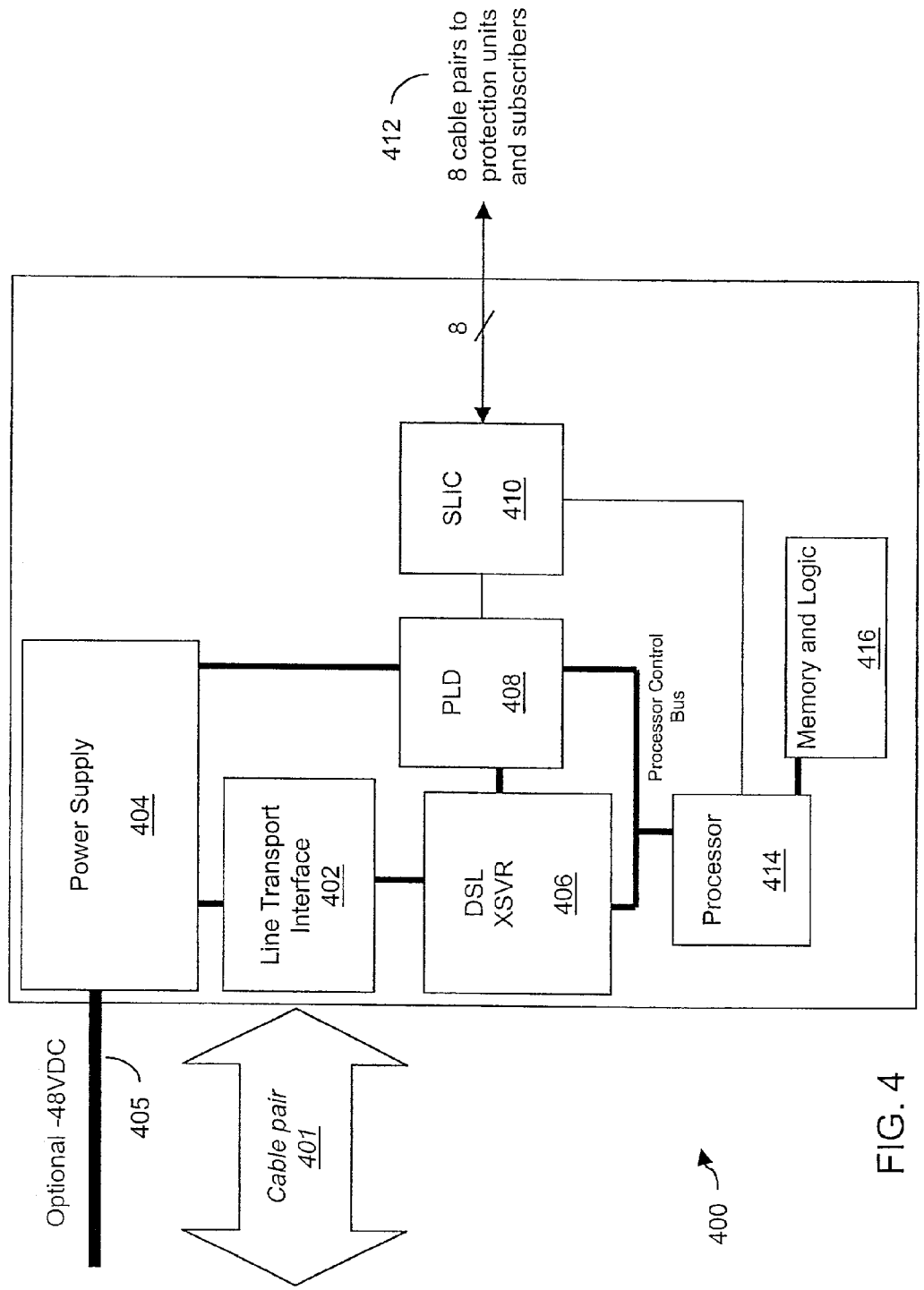
FIG. 4 is a block diagram of a remote terminal unit.

FIG. 4 is a block diagram of a Remote Terminal Unit (RTU) 400 configured in accordance with the teachings of this disclosure. The RT 400 may include a line transport interface 402 for providing power to a power supply 404 as disclosed above. The interface 402 may also be configured to interface data from the cable pair 401 to the DSL transceiver 406.

As the RTU 400 may be deployed in the outside plant (OSP), it may be configured to draw power from the upstream cable pair 401. The RTU 400 may include a power supply 404 configured to draw power from the cable pair and provide the necessary power to the various elements of the RTU 400 The line transport interfaces 402 may be configured to provide the DC component placed on the pair by the carrier node 210 to the power supply 404. The power supply 404 may then transform the higher DC voltage provided by the cable pair into the appropriate voltages required by the elements of the RTU 400, such as 2.5, 3.3, or 5 Volts.

However, the power requirements for a remote terminal can be substantial, and drawing power from the cable pair may limit the ultimate reach of service. To facilitate longer reaches, the RTU 400 may include an optional local power input 405 for providing local power. Additionally, a local or line power user selection capability may be provided by the power supply 404, such as through a switch. Alternatively, the appropriate power condition may be auto-sensed.

The RTU 400 may also include a DSL transceiver 406 coupled to a PLD 408. The DSL transceiver 406 is preferably configured to demodulate a DSL signal and provide POTS channels to the PLD 408. The PLD 408 may comprise a FPGA as is known in the art, and is preferably configured to receive the demodulated voice channels from the DSL transceiver 406 and determine the ultimate destination of each channel. The PLD 408 may also be configured to provide additional functionality, such as call set-up and signaling.

The RTU 400 may also include POTS line interfaces 410. The interfaces 410 may be configured to provide Subscriber Line Interface Circuitry (SLIC) as is known in the art.

The output of the RTU 400 may then be coupled for distribution to subscribers through cable pairs 412.

The RTU 400 may also include a processor 414 for providing control. The RTU 400 may also include associated memory and support circuitry 416 for the storage and retrieval of data and instructions. The processor 414 or the memory 416 may also include non-volatile memory elements to non-volatile programming capability. It is contemplated that a wide variety of processors may be used, such as a Motorola® Cold Fire processor. The processor 414 may be coupled to the various elements of the RTU 400 through a bus as is known in the art.

Figure 5:
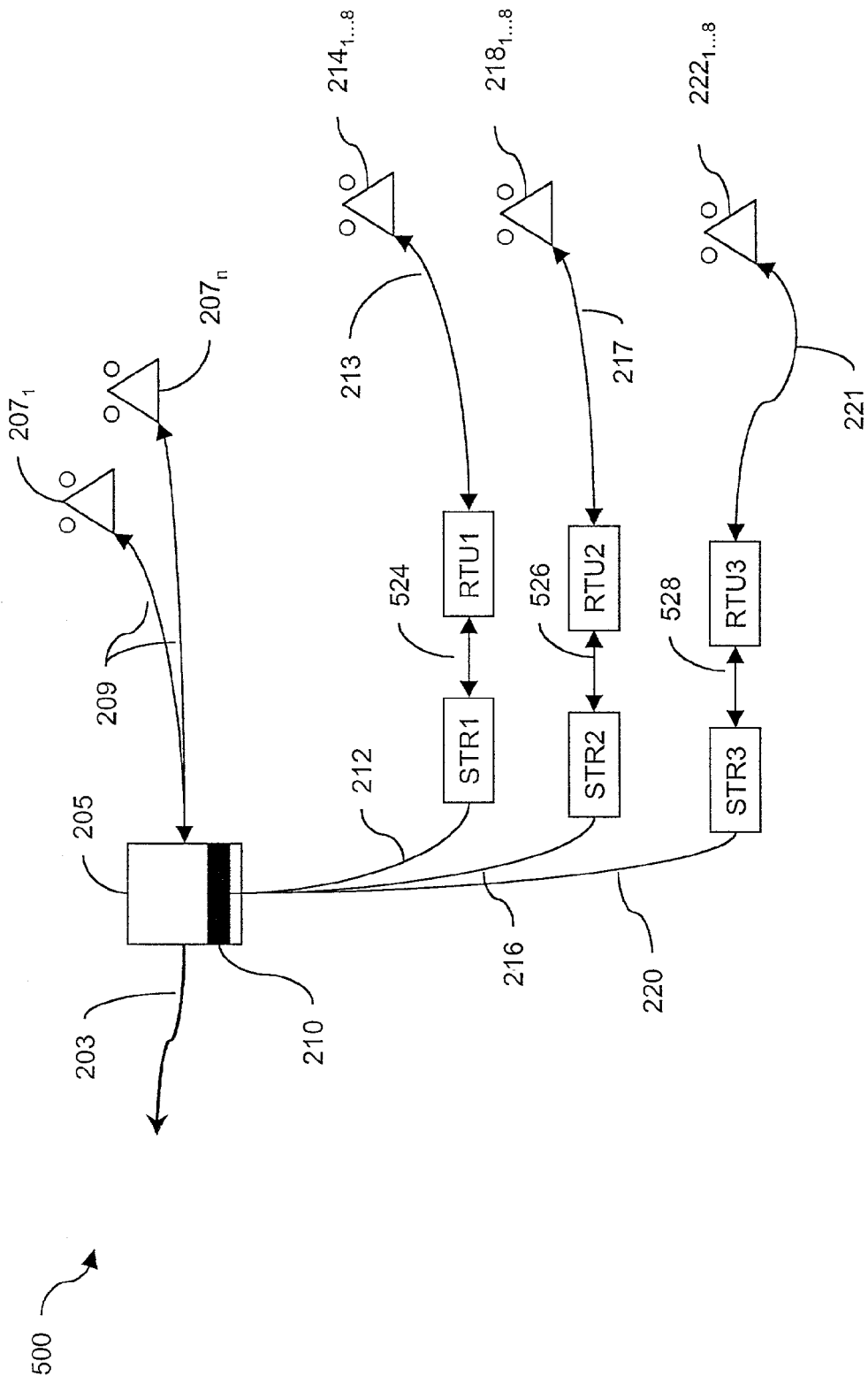
FIG. 5 is a block diagram of a voice system including a carrier node and straight-through repeaters configured in accordance with this disclosure.

To extend the reach of the present system, repeaters may be provided. FIG. 5 is a block diagram of a system 500 including three straight-through repeaters (STR) STR1, STR2, and STR3. The system 500 of FIG. 5 includes the structure of FIG. 2B, with the addition of the repeaters STR1, STR2, and STR3 interposed between the carrier node 210 and the Remote Terminal Units RTU1, RTU2, and RTU3. The repeaters STR1, STR2, and STR3 may be coupled to their respective remote terminal unit with a DSL-compatible medium 524, 526, and 528, respectively. Such a medium may comprise a twisted copper pair. It is contemplated that repeaters may be provided at intervals of approximately 12 kft, limited by the losses imposed by the transmission medium, and the power consumption of the downstream components, including the remote terminal unit. In an exemplary embodiment, up to five repeaters may be used when the remote terminal unit is line powered. However, when the remote terminal unit is remotely powered, even more repeaters may be used, giving virtually unlimited reach.

Figure 6:
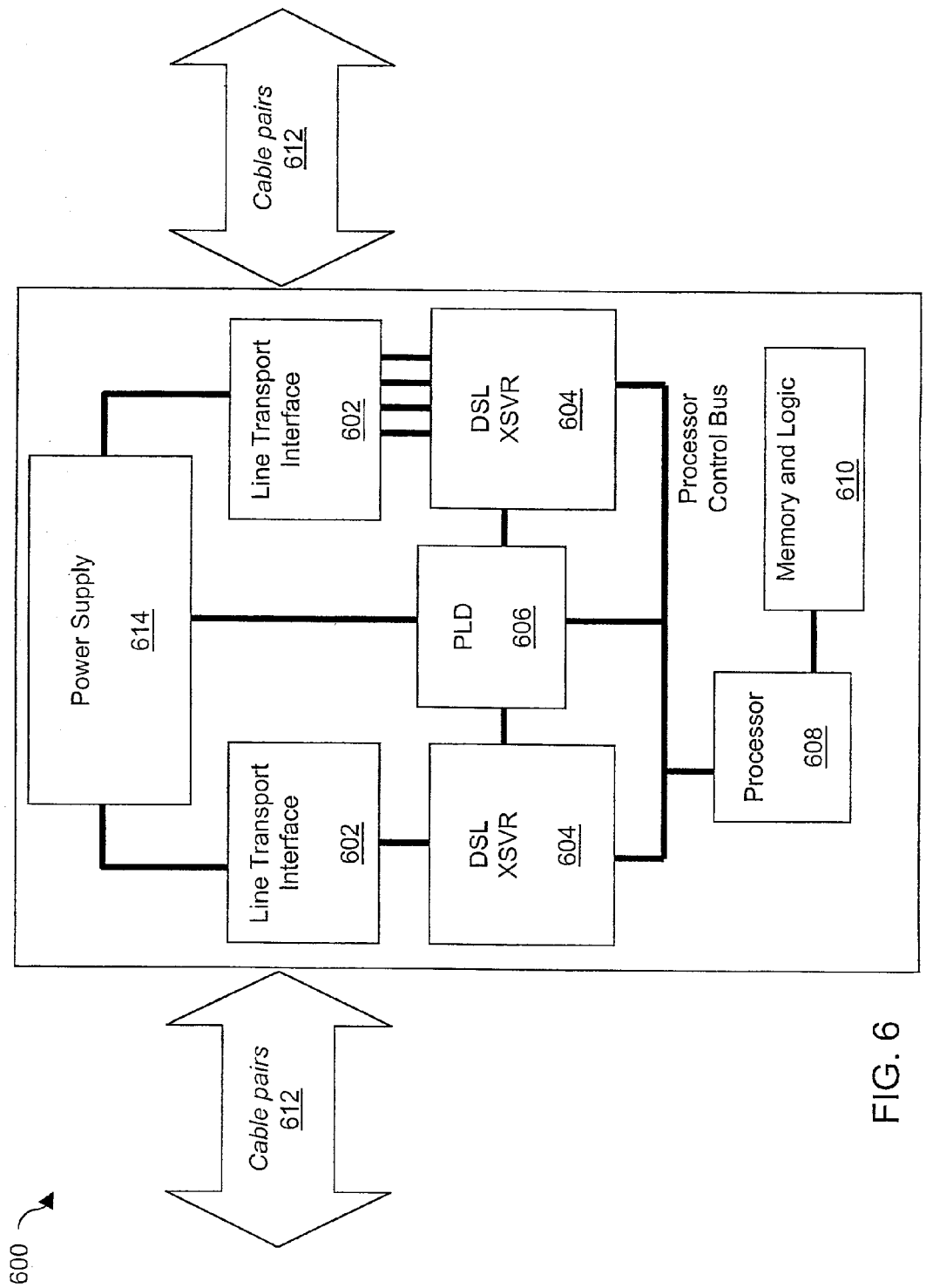
FIG. 6 is a block diagram of a straight-through repeater.

FIG. 6 is a block diagram of a straight-through repeater 600 configured in accordance with the teachings of this disclosure. The repeater 600 may include a pair of line transport interfaces 602 coupled to a respective pair of DSL transceivers 604. The interfaces 602 and DSL transceivers 604 may be configured as described above. The interfaces 602 may be coupled to the cable pairs 612 using circuitry as described above.

The DSL transceivers 604 may be coupled to each other through a PLD 606 for providing timing control between the transceivers 604. The PLD may comprise a FPGA as is known in the art, and may be programmed to ensure that timing slots are aligned.

The repeater 600 may also include a processor 608 for providing control of the repeater 600. The repeater may also include associated memory and support circuitry 610 for the storage and retrieval of data and instructions. The processor 608 or the memory 610 may also include non-volatile memory elements to non-volatile programming capability. It is contemplated that a wide variety of processors may be used in the repeater 600, such as a Motorola® Cold Fire processor. The processor 608 may be coupled to the various elements of the repeater 600 through a bus as is known in the art.

As the repeater 600 may be deployed in the outside plant (OSP), it may be configured to draw power from the cable pairs 612. The repeater 600 may include a power supply 614 configured to draw power from the cable pairs 612 and provide the necessary power to the various elements of the repeater 600. One or more of the line transport interfaces 602 may be configured to provide the DC component placed on the line by the carrier node 210 to the power supply 614. The power supply 614 may then transform the higher DC voltage provided by the cable pairs 612 into the appropriate voltages required by the elements of the repeater 600, such as 2.5, 3.3, or 5 Volts. The unused power may then be re-coupled by one or more of the interfaces 602 back onto the cable pairs 612 for use by downstream equipment.

The system of this disclosure presents many advantages over prior art system. For example, the system of the present disclosure fits into a one RU enclosure, typically referred to as a "pizza box" form factor. In addition, it may be 14" wide and 10" deep. This form factor will typically fit in to a CEV, Hut, or RT, and may power three, eight-line POTS systems.

A further advantage is further realized in the cost savings. As will be appreciated by those skilled in the art, as the circuitry of the present disclosure used to interface one DS1 line may be less expensive that the comparable circuitry necessary to interface and transmit 24 analog POTS channels. A further advantage provided by the system of this disclosure is modem speed. If a subscriber dials in through the system using an analog modem such as a v.90 modem, the subscriber will typically achieve higher speeds through the present system rather than dialing in through the CO shelf. This is because of the absence of an additional A/D conversion step in the present system.

Finally, the system of the present disclosure provides a cost effective solution to transporting multiple POTS lines. For example, prior to the system of the present disclosure, the prior art employed a CO-based shelf and line cards to transport multiple POTS lines using DSL symmetric transport between a Central Office and an RT. Prior art CO shelves may contain as many as 20 line cards, and be housed in an enclosure 5 RU high (RU=1.75 inches high). Such as form factor is unsuitable to be installed in a Controlled Environment Vault (CEV), Hut, or an RT cabinet. Furthermore, the capacity of a whole CO shelf is often too great for an RT application: The CO shelf can house 20 line cards, and each line card can power one, eight line system, and typically 20 systems are not needed from an RT. Thus, the system of the present disclosure provides a cost-effective solution for the transportation of POTS lines using DSL technology.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. An apparatus for multiplexing a digital data line with multiple DSL outputs comprising:
an enclosure having a height of one rack-unit;
a transceiver disposed within said enclosure for providing connectivity to a digital data line providing 24 DS0 channels to said apparatus; and
N DSL transceivers disposed within said enclosure for multiplexing 24/N DS0 channels onto a corresponding number of DSL-compatible transmission media using DSL technology.

2. The apparatus of claim 1, wherein said data line comprises a T1 line.

3. The apparatus of claim 1, wherein said data line comprises a DS1 line.

4. The apparatus of claim 1, wherein said N number of DSL transceivers comprises 3 DSL transceivers for multiplexing 24 DS0 channels onto three coppers pairs containing 8 DS0 channels each.

5. The apparatus of claim 1, wherein said N number of DSL transceivers comprises 2 DSL transceivers for multiplexing 24 DS0 channels onto two coppers pairs containing 12 DS0 channels each.

6. The apparatus of claim 1, further including a line transport interface for providing line power on said DSL-compatible media.

7. The apparatus of claim 1, further including an analog communications module for providing diagnostic information and connectivity to a central office (CO).

8. The apparatus of claim 1, wherein said enclosure may be mounted within a remote terminal (RT).

9. The apparatus of claim 8, wherein said apparatus receives said digital data line from said RT.

10. An apparatus for multiplexing a digital data line with multiple DSL outputs comprising:
enclosure means for enclosing the apparatus within a height of one rack-unit;
transceiver means disposed within said enclosure for providing connectivity to a digital data line providing 24 DS0 channels to said apparatus; and
DSL transceiver means disposed within said enclosure for multiplexing said 24 DS0 channels onto a predetermined number of DSL-compatible transmission media using DSL technology.

11. The apparatus of claim 10, wherein said data line comprises a T1 line.

12. The apparatus of claim 10, wherein said data line comprises a DS1 line.

13. The apparatus of claim 10, wherein said DSL transceiver means comprises 3 DSL transceivers for multiplexing 24 DS0 channels onto three coppers pairs containing 8 DS0 channels each.

14. The apparatus of claim 10, wherein said DSL transceiver means comprises 2 DSL transceivers for multiplexing 24 DS0 channels onto two coppers pairs containing 12 DS0 channels each.

15. The apparatus of claim 10, further including an interface means for providing line power on said DSL-compatible media.

16. The apparatus of claim 10, further including analog communications means module for providing diagnostic information and connectivity to a central office (CO).

17. The apparatus of claim 10, wherein said apparatus may be mounted within a remote terminal (RT).

18. The apparatus of claim 17, wherein said apparatus receives said digital data line from said RT.

19. A Plain Old Telephone Service (POTS) distribution system comprising:
a carrier node comprising;
an enclosure having a height of one rack-unit;
a transceiver disposed within said enclosure for providing connectivity to a digital data line providing 24 DS0 channels; and N DSL transceivers disposed within said enclosure for multiplexing 24/N DS0 channels onto a corresponding number of DSL-compatible transmission media using DSL technology; and at least one outside plant Remote Terminal Unit (RTU) operatively coupled via said DSL-compatible transmission medium to said carrier node, said RTU configured to provide POTS service to a plurality of subscribers.

20. The system of claim 19, wherein said data line comprises a T1 line.

21. The system of claim 19, wherein said data line comprises a DS1 line.

22. The system of claim 19, wherein said N number of DSL transceivers comprises 3 DSL transceivers for multiplexing 24 DS0 channels onto three coppers pairs containing 8 DS0 channels each.

23. The system of claim 22, wherein each of said three copper pairs terminates in a corresponding RTU.

24. The system of claim 23, further including three straight-through repeaters, each of said repeaters operatively disposed between said carrier node and a corresponding remote terminal.

25. The system of claim 22, wherein each of said two copper pairs terminates in a corresponding RTU.

26. The system of claim 25, further including two straight-through repeaters, each of said repeaters operatively disposed between said carrier node and a corresponding remote terminal.

27. The system of claim 19, wherein said N number of DSL transceivers comprises 2 DSL transceivers for multiplexing 24 DS0 channels onto two coppers pairs containing 12 DS0 channels each.

28. The system of claim 19, wherein said carrier node further comprises a line transport interface for providing line power on said DSL-compatible media.

29. The system of claim 19, wherein said carrier node further comprises an analog communications module for providing diagnostic information and connectivity to a central office (CO).

30. The system of claim 19, wherein said enclosure may be mounted within a remote terminal (RT).

31. The system of claim 30, wherein said apparatus receives said digital data line from said RT.

32. The system of claim 19, further including at least one straight-through repeater operatively disposed between said carrier node and said at least one RTU.

* * * * *